United States Patent [19]
Ljungberg et al.

[11] Patent Number: 5,493,566
[45] Date of Patent: Feb. 20, 1996

[54] FLOW CONTROL SYSTEM FOR PACKET SWITCHES

[75] Inventors: Martin P. A. Ljungberg, Stockholm; Lars-Göran Petersen, Tumba, both of Sweden

[73] Assignee: Telefonaktiebolaget L M. Ericsson, Stockholm, Sweden

[21] Appl. No.: 264,905

[22] Filed: Jun. 24, 1994

Related U.S. Application Data

[63] Continuation of Ser. No. 990,511, Dec. 15, 1992, abandoned.

[51] Int. Cl.$^6$ .................................................. H04J 3/24
[52] U.S. Cl. ........................................ 370/60; 370/60.1
[58] Field of Search ........................ 370/94.3, 13, 16, 370/17, 60, 60.1, 94.1, 94.2, 85.6, 58 1, 58.2, 68.1; 340/825.5, 825.51

[56] References Cited

U.S. PATENT DOCUMENTS

| | | | |
|---|---|---|---|
| 4,837,761 | 6/1989 | Isono et al. | 370/60 |
| 4,993,025 | 2/1991 | Vesel et al. | 370/94.1 |
| 5,042,029 | 8/1991 | Hayakawa | 370/60 |
| 5,090,011 | 2/1992 | Fukuta et al. | 370/60 |
| 5,119,372 | 6/1992 | Verbeek | 370/94.1 |
| 5,128,927 | 7/1992 | Killat et al. | 370/60 |
| 5,159,591 | 10/1992 | Gohara et al. | 370/60 |
| 5,165,021 | 11/1992 | Wu et al. | 370/85.13 |
| 5,168,492 | 12/1992 | Beshai et al. | 370/60.1 |
| 5,253,248 | 10/1993 | Dravida et al. | 370/16 |

FOREIGN PATENT DOCUMENTS

0436069A2  7/1991  European Pat. Off. .

OTHER PUBLICATIONS

Badran et al., "Head of Line Arbitration in ATM Switches with Input–Output Buffering and Backpressure Control", Dec. 1991, pp. 347–351.

William E. Stephens, Martin DePrycker, Fouad A. Tobagi and Takehiko Yamaguchi; "Large–Scale ATM Switching Systems for B–ISDN"; IEEE Journal, vol. 9, No. 8, Oct. 1991, pp. 1157–1160.

H. Jonathan Chao; "A Recursive Modular Terabit/Second ATM Switch"; IEEE Journal, vol. 9, No. 8, Oct. 1991, pp. 1161–1172.

Fouad A. Tobagi, Timothy Kwok and Fabio M. Chiussi; "Architecture, Performance, and Implementation of the Tandem Banyan Fast Packet Switch"; IEEE Journal, vol. 9, No. 8, Oct. 1991, pp. 1173–1193.

Shigeo Urushidani; "Rerouting Network: A High–Performance Self–Routing Switch for B–ISDN"; IEEE Journal, vol. 9, No. 8, Oct. 1991, pp. 1194–1204.

Shih–Chian Yang and John A. Silvester; "A Reconfigurable ATM Switch Fabric for Fault Tolerance and Traffic Balancing"; IEEE Journal, vol. 9, NO. 8, Oct. 1991, pp. 1205–1217.

Arata Itoh; "A Fault–Tolerant Switching Network for B–IDSN"; IEEE Journal, vol. 9, No. 8, Oct. 1991, pp. 1218–1226.

(List continued on next page.)

Primary Examiner—Douglas W. Olms
Assistant Examiner—Chau T. Nguyen
Attorney, Agent, or Firm—Jenkens & Gilchrist

[57] ABSTRACT

A system for controlling the flow of data cells through a packet switch combines both input and output buffers in a feedback loop. The fullness level of output buffers is continuously monitored and reported to an access device on the input side of the switch. The access device includes input buffers and a throttling device to stop the flow of data cells, and hold them in the input buffers, when the fullness level of the output buffers exceeds a predetermined level. A status message of output buffer fullness is compared to an access message indicating which output buffers are addressed by cells in the input buffers, and only those cells addressed to overfull output buffers are stopped by the throttling device. The efficiency of the packet switch is improved over switches using input buffers alone. The required capacity of the output buffers is reduced, thereby making it easier and less expensive to provide the required bandwidth.

23 Claims, 7 Drawing Sheets

OTHER PUBLICATIONS

Thomas C. Banwell, Renée C. Estes, Sarry F. Habiby; Gary A. Hayward; Thomas K. Helstern, Gail R. Lalk, Derek D. Mahoney, Donald K. Wilson and Kenneth C. Young, Jr.; "Physical Design Issues for Very Large ATM Switching Systems"; IEEE Journal, vol. 9, No. 8, Oct. 1991, pp. 1227–1238.

Takahiko Kozaki, Noboru Endo, Yoshito Sakurai, Osamu Matsubara, Masao Mizukami and Keni'chi Asano; "32×32 Shared Buffer Type ATM Switch VLSI's for B-ISDN's"; IEEE Journal, vol. 9, No. 8, Oct. 1991, pp. 1239–1247.

Yasuro Shobatake, Masahiko Motoyama, Emiko Shobatake, Takashi Kamitake, Shoichi Shimizu, Makoto Noda and Kenji Sakaue; "A One-Chip Scalable 8*8 ATM Switch LSI Employing Shared Buffer Architecture"; IEEE Journal, vol. 9, No. 8, pp. 1248–1254.

Thomas R. Banniza, Gert J. Eilengberger, Bart Pauwels and Yves Therasse; "Design and Technology Aspects of VLSI's for ATM Switches"; IEEE Journal, vol. 9, No. 8, Oct. 1991, pp. 1255–1264.

Manolis Katevenis, Stefanos Sidiropoulos and Costas Courcoubetis;"Weighted Round-Robin Cell Multiplexing in a General-Purpose ATM Switch Chip"; IEEE Journal, vol. 9, No. 8, Oct. 1991, pp. 1265–1279.

Atsuo Itoh, Wataru Takahashi, Hiroshi Nagano, Masaru Kurisaka and Susumu Iwasaki; "Practical Implementation and Packaging Technologies for a Large-Scale ATM Switching System"; IEEE Journal, vol. 9, No. 8, Oct. 1991, pp. 1280–1288.

James N. Giacopelli, Jason J. Hickey, William S. Marcus, W. David Sincoskie and Morgan Littlewood; "Sunshine: A High Performance Self-Routing Broadband Packet Switch Architecture"; IEEE Journal, vol. 9, No. 8, October 1991, pp. 1289–1298.

Wolfgang Fischer, Oswald Fundneider, Ernst-Heinrich Goeldner and K. A. Lutz; "A Scalable ATM Switching System Architecture"; IEEE Journal, vol. 9, No. 8, Oct. 1991, pp. 1299–1307.

Haruhiko Matsunaga and Hitoshi Uematsu; "A 1.5 Gb/s 8×8 Cross-Connect Switch Using a Time Reservation Algorithm"; IEEE Journal, vol. 9, No. 8, Oct. 1991, pp. 1308–1317.

Michael D. Schroeder, Andrew D. Birrell, Michael Burrows, Hal Murray, Roger M. Needham, Thomas L. Rodeheffer, Edwin H. Satterthwaite and Charles P. Thacker; "Autonet: A High-Speed, Self-Configuring Local Area Network Using Point-to-Point Links"; IEEE Journal, vol. 9, No. 8, Oct. 1991, pp. 1318–1335.

Ioannis Stavrakakis; "Efficient Modeling of Merging and Splitting Processes in Large Networking Structures"; IEEE Journal, vol. 9, No. 8, Oct. 1991, pp. 1336–1347.

Arturo Cisneros and Charles A. Brackett; "A Large ATM Switch Based on Memory Switches and Optical Star Couplers"; IEEE Journal, vol. 9, No. 8, Oct. 1991, pp. 1348–1360.

FLOW CONTROL SYSTEM FOR PACKET SWITCHES

This is a continuation of application Ser. No. 07/990,511, filed Dec. 15, 1992, now abandoned.

BACKGROUND OF THE INVENTION

1. Field of the Invention

The invention relates to packet switches for data communications and telephony traffic and, more particularly, to the control of the flow of information routed through such switches.

2. History of the Prior Art

In modern telecommunication systems, information is grouped together in units of data referred to as "packets" or "cells", each containing a data field comprising an address to which the cell is to be delivered and another data field which defines the information to be transferred to that address. A cell may also contain a data field containing the address of the source from which the cell originated. Such data cells are conventionally routed through communication systems from a source to a destination by means of packet switches which route the cells through a data network in accordance with the address information contained within them. Such packet switches receive a flow of data cells over one or more incoming links, read the addresses on the cells, and then route them out of the switch on one or more outgoing links toward their intended destinations.

Figure 1:
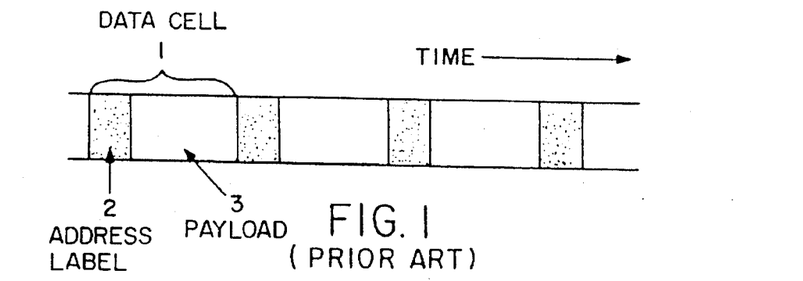
FIG. 1 (Prior art) is an illustrative flow of ATM cells on an ATM link.

The continuous flow of data cells in packet switches used in implementation of the telecommunications standard known as asynchronous transfer mode (ATM), as specified by the International Telegraph and Telephone Consulting Committee (C.C.I.T.T.), is illustratively shown in FIG. 1. The destination of each cell 1 is determined by an identifier address, known as a label 2, which is transmitted with and forms a part of each cell. A payload 3 contains transported user data.

Figure 2:
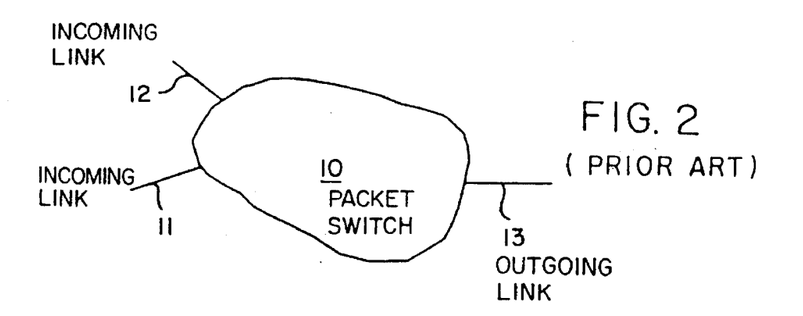
FIG. 2 (Prior art) is an illustrative packet switch including a pair of input links and a single output link.

Packet switches are constructed and function so that several cells intended for a single destination may arrive at the switch simultaneously over a plurality of different links. For example, in FIG. 2 there is illustrated the circumstance in which two different cells arrive at a packet switch 10 at the same time via two separate incoming links 11 and 12 and both are destined for the single outgoing link 13. Since the transmission capacity of each link is limited, the outgoing link 13 is able to handle only one of the cells at any given moment in time. The other cell must be stored temporarily in a buffer until it can be sent out over the outgoing link 13 by the switch 10. If a plurality of data cells addressed to link 13 arrive on the incoming links 11 and 12 over a longer period of time with a data rate which exceeds the capacity of the outgoing link 13, the need for buffering the cells addressed to link 13 will become even greater. If the packet switch 10 has insufficient space to buffer these cells, a certain number of the cells will be lost during high traffic load periods. Thus, the ability of the packet switch 10 to handle situations in which the traffic toward one link is extremely high will depend upon the buffering capacity of the switch itself.

There are two conventional methods to achieve packet switch buffering. One method includes the use of input buffers to the switch and the other includes the use of output buffers. In the situations in which input buffers are employed, data cells are buffered on the incoming links. The data cells are then taken or "plucked" from within the buffers and switched to the correct outgoing links through the intermediary of a crosspoint matrix. For example, in the illustration shown in FIG. 3, a plurality of incoming links 14–16 are connected respectively to input buffers 17–19 the output of each of which leads to a switch matrix 21. Data cells are written into and read from each input buffer 17–19 on a first-in, first-out basis, at a rate which is not greater than the capacity of the incoming links 14–16. This enables the input buffers to be implemented in a relatively simple manner even in the case of packet switches of relatively high individual link capacity. As a result, in terms of space for buffering cells, very large capacity input buffers can be readily constructed, and the size of the input buffers can be adapted to the nature of the traffic on the particular link to which each individual input buffer is connected.

Figure 3:
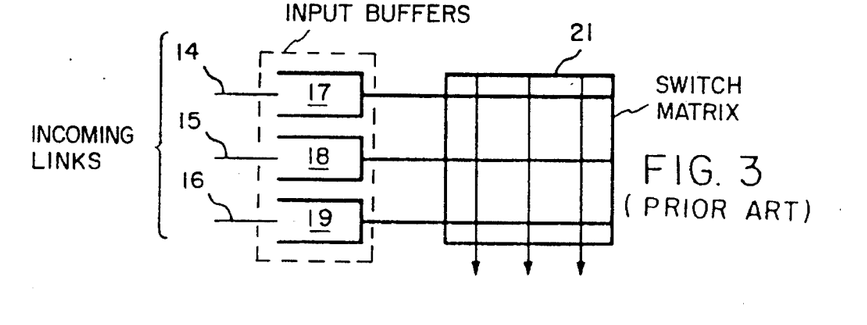
FIG. 3 (Prior art) is a block diagram illustrating a packet switch equipped with input buffers.

When the data cells are plucked from within the input buffers 17–19, it is possible that all of the cells which are first in the queue within each of the three buffers 17–19 have the same destination. In such cases, it is necessary to serve the buffers one after the other. While an input buffer is waiting to be served, all of the data cells in that buffer will wait, including those cells which lie further down in the queue and which are addressed to and destined for outgoing links which have no load on them at that particular moment. This, so-called, head-of-the-line (HOL) problem makes it impossible to fully utilize the capacity of a packet switch which is equipped with input buffers.

Figure 4:
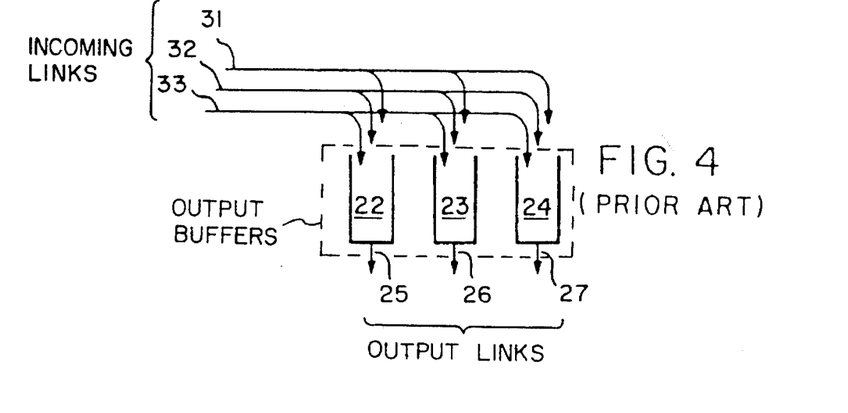
FIG. 4 (Prior art) is a block diagram illustrating output buffers for use on a packet switch.

One way of avoiding the HOL-problem in a packet switch configuration is by equipping the switch with output buffers. A switch of this type has an output buffer at each outgoing link, and data cells from all incoming links can be written into the buffer of the output link defined by the address within each cell. For example, there is shown in FIG. 4 a plurality of output buffers 22–24 each of which is connected respectively to an output link 25–27 and is shown receiving data cells addressed to each one via incoming links 31–33.

A major problem with a configuration using output buffers, however, is that each output buffer must have the capacity and bandwidth to store information cells arriving near simultaneously from multiple input links. In the worst-case scenario, the output buffers must be able to store data arriving simultaneously from every input link on the switch. This makes the implementation of output buffers extremely difficult and expensive. In FIG. 4 it can be seen that it is possible that data cells which are destined for the same outgoing link, e.g., outgoing link 25, may arrive at output buffer 22 near simultaneously on all three of the incoming links 31–33. Therefore each output buffer must have sufficient bandwidth to write data from all incoming links into the output buffer at a speed which will avoid the loss of data cells. Since ATM switches operate at data rates of 150 megabits per second, it is extremely difficult and expensive to construct output buffers of sufficient bandwidth and memory capacity.

While certain solutions to these problems have been proposed, such as, for example, the use of intermediate output buffers or the common use of one output buffer which splits to several individual outputs, these solutions have not been adequate. The large bandwidth required of output buffers in multiple input packet switches, in order to avoid the loss of data at high transfer rates, makes it very difficult to construct output buffers of adequate capacity. These output buffering problems are particularly acute in the case of packet switches employed in systems which implement asynchronous transfer mode (ATM) data transfer and operate at data rates in excess of 150 megabits per second.

Packet switches in ATM systems may be implemented in a single device comprising input buffers, a switch fabric which performs the actual switching operation, and output buffers. Alternatively, an ATM switch may be implemented in two parts called a switch port and a switch core. The switch port, in turn, may have two sides, an input side and an output side. The input side of the switch port interfaces with an associated incoming communications network, terminates the incoming ATM link, and performs the input buffering functions. The switch port is connected to the switch core which then performs the switching operation. Data cells are then sent to the output side of the switch port to which they are addressed, where the output buffering functions are performed.

It would be a distinct advantage to employ a switching configuration which employs both input buffering to a packet switch as well as output buffering in an efficient and economical manner which solves the problem of simultaneously requiring large buffer capacity and bandwidth.

SUMMARY OF THE INVENTION

The present invention combines both input buffers and output buffers in a packet switch. The switch is constructed with output buffers in a conventional manner, but with the addition of an access device for protecting the output buffers from becoming overfull. The switch avoids cell losses by providing both input buffers on the incoming links and a throttling means for holding cells in the input buffers when the addressed output buffer is overfull.

In one aspect of the present invention, a device for detecting high buffer content is connected to each of the output buffers, and the status of the fullness of the output buffers is transmitted continuously to an access device comprising input buffers and throttling means. When the fullness level of any of the output buffers exceeds a predetermined level, the traffic to this output buffer is stopped and stored in the input buffers so as to avoid overfilling the output buffer. When the throttling means is activated, data cells addressed to a high content output buffer are stored in the input buffer on the link concerned until the output buffer content is reduced. Cells are then transmitted from the input to the output buffer. The flow between the input buffers and the output buffers is thereby controlled, and output buffers may be constructed without the capacity and bandwidth to accept and store cells from every input link simultaneously.

In another aspect, the present invention is a method of controlling the flow of data cells through a packet switch. The steps include connecting at least one access device to the input side of the packet switch. The access device includes at least one input buffer and a throttling means for stopping the flow of data cells through the input buffer. The method also includes connecting at least one output buffer to the output side of the packet switch, monitoring the fullness level of the output buffer, communicating the fullness level of the output buffer to the access device, and stopping the flow of data cells through the input buffer when the fullness level of the output buffer exceeds a predetermined level.

BRIEF DESCRIPTION OF THE DRAWING

The invention will be better understood and its numerous objects and advantages will become more apparent to those skilled in the art by reference to the following drawing, in conjunction with the accompanying specification, in which.

DETAILED DESCRIPTION

There is found in the ATM-switch of the present invention a form of flow control between the switch and connected application devices. This flow control enables connections to be handled more effectively in the system in the case of sudden traffic increases (bursts). The flow control operates at connection level, i.e., the flow of data in each switch connection is controlled separately.

Figure 5:
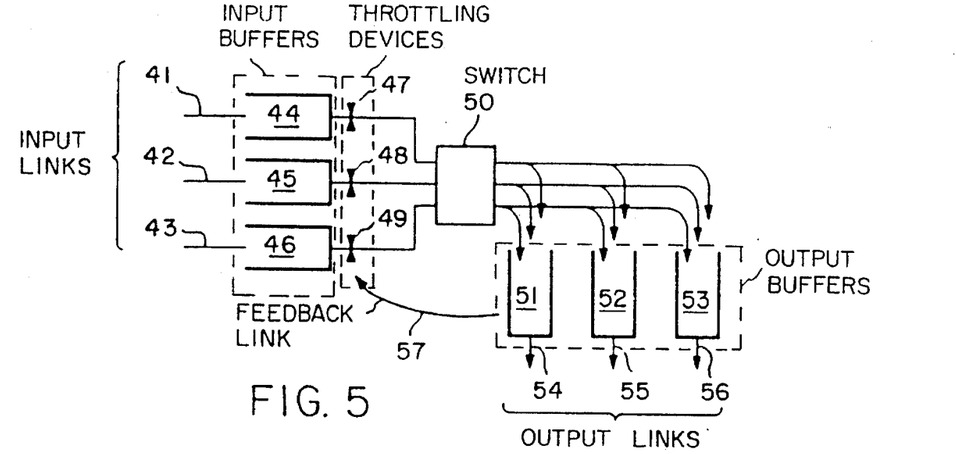
FIG. 5 is a block diagram illustrating a packet switch construction including both input and output buffers and a feedback mechanism for controlling the flow of data in accordance with the teachings of the present invention.

A central concept of the present invention is that of constructing a packet switch having output buffers which are protected from becoming overfull and risking the loss of data cells at high data transfer rates by including a means of detecting and controlling the contents of the output buffers. As shown in FIG. 5, a plurality of input links 41–43 are connected, respectively to a plurality of input buffers 44–46. The output of each of the input buffers includes a throttling means 47–49, respectively, each of which is controlled to restrict the rate at which data is output from its respective input buffer into a packet switch 50. Outputs from the switch 50 are connected to a plurality of output buffers 51–53 each of which is connected to an output link 54–56. Data is stored and retrieved in all the buffers in a first-in, first-out (FIFO) manner. A mechanism is included and associated with the output buffers 51–53 for monitoring the fullness level of those output buffers and providing a feedback signal via illustrative link 57 to communicate with the means for controlling the throttling means 47– 49. The measuring device may be, for example, a half-full flag or similar device which sends a digital signal "0" indicating that the buffer is available for transmission, or a "1" indicating that the buffer is not available. Thus, when any output buffer becomes unduly full, so that there arises a risk of losing data cells as a result of the inability to accept cells addressed to a link associated with that output buffer, a signal is sent to the input buffer(s) 44–46 to slow the transmission of data having any cells therein destined for that output buffer which is unduly full. In this way, output buffers of smaller capacity may be implemented. Since it is easier and less expensive to provide smaller buffers with sufficient bandwidth, this greatly reduces the difficulty and expense of implementing the output buffers in ATM switches.

More specifically, a device for detecting high buffer content is connected to each of the output buffers, and the status of buffer fullness in each of the output buffers is sampled during each cell time. This information is sequentially placed into a status message, and is then transmitted to the mechanism controlling the data flow restrictions at the input buffers. If any of the output buffers has a high buffer content, the traffic to this buffer can be throttled so as to avoid overfilling the buffer. The throttling means may include a clock device which is stopped when it is desired to stop the flow of data cells, and is restarted when the flow is again desired. When the constriction or throttling means is activated, data cells addressed to a high content output buffer are stored in the input buffer on the link concerned until the output buffer content is reduced, and the status message indicates that the output buffer is available. Cells are then transmitted from the input to the output buffer. Thus, the system enables the control of the flow between the input buffers and the output buffers through the ATM switch.

The size, i.e. storage capacity of the output buffers and the data flow control mechanism, i.e., the performance parameters of the means for signalling the output buffer contents and the means for throttling the flow from the input buffers, are selected so that the output buffers will not overfill before the data input is throttled. In larger switch embodiments, with greater numbers of output links and buffers, the output buffers may be grouped so that each bit in the status message designates a group of buffers rather than a single output buffer. If any buffer in the group is overfilled, data traffic to the designated group is stopped until all buffers in the group are available.

Figure 6:
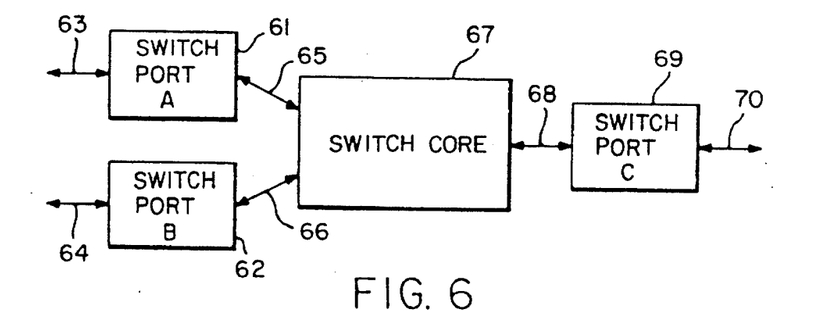
FIG. 6 is an illustrative packet switch having multiple input switch ports sending data to a single output switch port employed in an ATM switching system.

In some configurations, packet switches are implemented in a single device comprising input buffers, a switch fabric which performs the actual switching operation, and output buffers. Alternatively, an ATM switch may be implemented in two parts called a switch port and a switch core. Referring next to FIG. 6, there is shown an ATM switch construction embodiment comprising switch ports and a switch core in which a pair of switch ports 61 and 62 are connected to incoming links 63 and 64, and are coupled through connecting links 65 and 66 into a switch core 67. A coupling link 68 connects the data output from the switch core to an outgoing switch port 69 which is, in turn, connected to an outgoing link 70.

Each switch port comprises an input side and an output side, and any switch port may send data cells to any other switch port connected to the switch core 67. Each of the switch ports 61, 62 and 69 interfaces with an incoming and outgoing link and is responsible for adaptation of the data format to a format which is acceptable to the switch core. The switch ports translate the address of the cells to fit an internal addressing used within the switch, and then in the outgoing link, the switch ports translate the address again to match the format of the particular application to which the cell is addressed.

The switch core 67 is a matrix which deals with the space selection (switching) and output buffering of data cells coming through the switch. In the preferred embodiment, flow control is supported for switches of up to 24 links. Switch cores for switches of such small sizes are constructed with only one buffering stage. Thus, there is one buffer for each output and no other buffers in the switch core.

Figure 7:
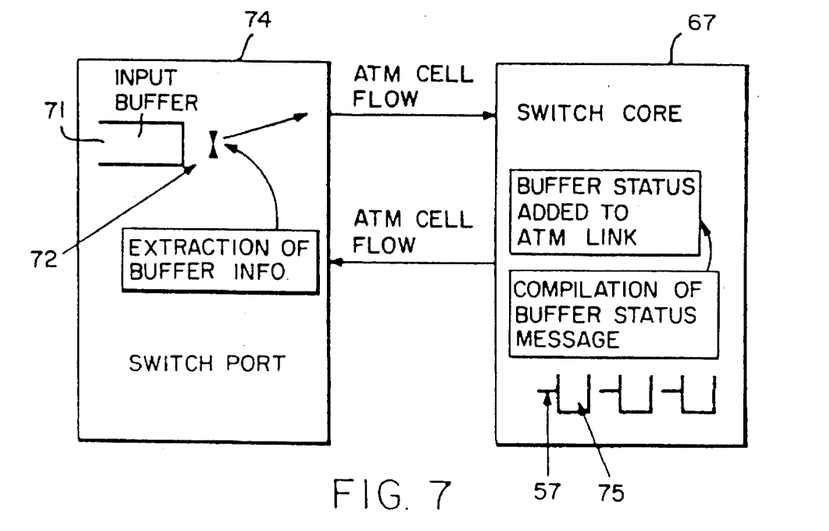
FIG. 7 is a block diagram illustrating the flow of information on buffer status between a switch core and a switch port having an input buffer and a throttling means within the switch port.

Input buffers may be placed in the switch ports where information is stored until it can be transmitted further. FIG. 7 is a block diagram illustrating an embodiment in which a switch port with bi-directional links contains an input buffer and throttling means.

Figure 8:
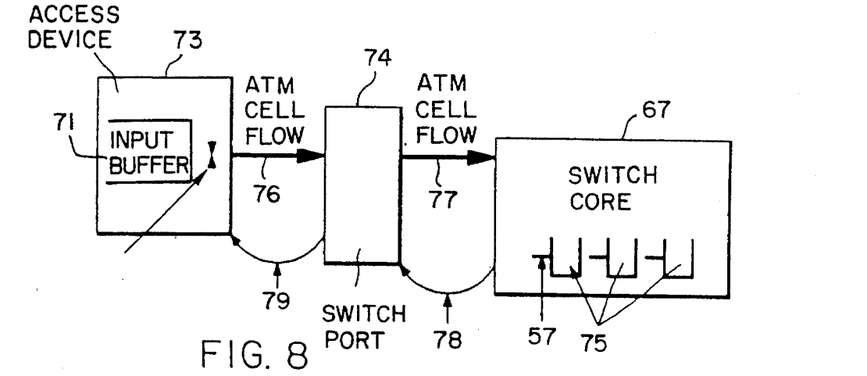
FIG. 8 is a block diagram illustrating the flow of information on buffer status between a switch core, a switch port, and an access device having an input buffer and throttling means in an alternative embodiment of the system of the present invention.

FIG. 8 illustrates an alternative configuration in which the input buffers 71 and throttling means 72 are placed in an access device 73 upstream of the switch ports 74 so that data cells may be buffered there until the output buffers 75 to which they are addressed are indicated as available. This configuration may be utilized when it is desired to construct input buffers of differing sizes according to the particular telecommunications application to which each is linked.

In an ATM switch constructed in accordance with the principles of the present invention, the fullness of the output buffers 75 in the switch core 67 is constantly monitored by a device such as a half-full flag. If the content of an output buffer exceeds a threshold value, this is detected. Such observations related to the status of the output buffers are signalled continuously to the access devices 73 associated with each switch port 74 whether such access devices are located internally or externally to the switch ports. In this manner, the access devices 73 always have relevant information concerning those output buffers 75 which contain a large amount of data, i.e., are in danger of becoming overfull with the consequent loss of data cells. The access devices 73 utilize the output buffer status reports 57 to inhibit transmission of that traffic which is destined to those output buffers 75 which have the highest loads. Those data cells are retained in the input buffers 71.

The switch core 67 may signal the status of the output buffer contents to the switch ports 74 and access devices 73 in one of two ways. Such signals may be sent in the reverse direction on the same connecting links 76 and 77 used to transmit data cells to the switch core, as a part of an interface protocol between the switch ports and the switch core, or they may be sent on separate physical wires 78 and 79. If the signals are sent by protocol, it may be necessary, from time to time, to send across the switch, cells without payload information. Once the protocol information is received, the empty cell is dumped.

Signalling from the switch core 67 to the input buffer flow control means may contain information concerning the extent of buffer fullness, either by output or with respect to groups of outputs. If the signalling denotes that a single output buffer or a buffer in a small buffer group is approaching full capacity, the switch ports ensure that only the cells which are destined to this buffer or to the buffers in this buffer group are inhibited.

The switch core is common to the ATM switch as a whole and serves the function of space selection and output buffering. The switch core is often constructed of two redundant planes in order to increase availability and the reliability of the switch in telecommunication applications. If something breaks in one plane, or communication otherwise becomes unavailable through one plane, the other plane is still available, and the switch is still operational. Therefore, each switch port has two links to the switch core, one to each plane, and each switch port receives output buffer status information from each switch-core plane.

The state of fullness in all output buffers is combined in the switch core. If the fullness of one or more buffers exceeds a predetermined threshold value, this is reported. This result of this compilation or combination may be sent to all switch ports at each cell time, as a Switch Access Status (SAS) parameter in the switch core interface. A label field in the switch core interface contains information relating to cell priority and cell destination when signals are moving from switch ports to switch core. When signalling from the switch core to the switch ports, this label field contains the compiled data on the state of output buffer fullness (SAS). SAS is discussed in more detail below. The signalling format is one in which each of the 24 output buffers is assigned a position in the 24-bit label field. If the fullness of the buffer exceeds the threshold value, the corresponding bit is set to "1".

The main purpose of the switch port, at this point in time, is to terminate redundancies in this flow control information received from the two switch-core planes. The present invention includes the following method of terminating redundant information related to the state of fullness of the output buffers.

When the information related to buffer status from the two switch-core planes arrives at the switch port, the information from switch plane A may not be identical to the information from switch plane B. For example, a given output buffer in switch plane A may be completely filled without the corresponding output buffer in switch plane B being filled. The switch port receives this flow-control information from switch planes A and B and eliminates redundant information from these two planes.

In the switch port, information relating to buffer fullness is compiled from the two planes in the form of redundancy termination. This compilation is determined by comparing the two planes, buffer-for-buffer. If a plane signals that a buffer is relatively full, the corresponding buffer in the other plane is also considered to be full. Thus, redundancy termination is effected by means of the principle that it is sufficient for one of the two redundant switch planes in the switch core to produce a signal indicative of the fact that a given output buffer is full in order for the restriction means to be ordered to stop all transmission to this output buffer. Thus, it is sufficient for output buffer 0 in plane A to be full in order for transmission to both this buffer in plane A and the corresponding output buffer 0 in switch plane B to be stopped.

Figure 9:
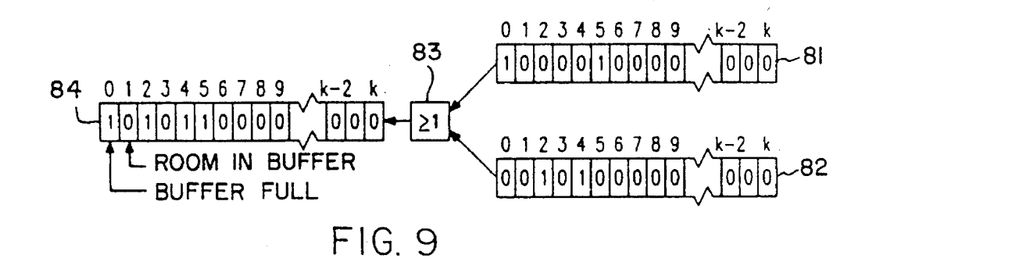
FIG. 9 is a block diagram illustrating a method of terminating redundant buffer fullness information received from a pair of switch-core planes in an ATM switch embodying the principles of the present invention.

FIG. 9 illustrates a method of terminating the redundancy of output buffer fullness information with the aid of an OR-gate. Data field 81 contains bits indicative of whether or not the corresponding output buffer in plane A is full, i.e. whether that bit position contains a "0" or a "1". Similarly, data field 82 contains bits indicative of whether or not the corresponding output buffer in plane B is full. The two data fields are mixed, bit-position by bit-position, in an OR-gate 83 to produce a composite data field 84 which then contains information comprising a composite of the status of the output buffers in both of the two redundant planes in the switch core. The combined information relating to buffer fullness in the switch core is inserted into the SAS parameter. In the preferred embodiment, SAS is a one-to-one copy of the redundancy-terminating information from the switch core, and is used to control the flow of cells from the input buffers into the switch core planes.

Figure 10:
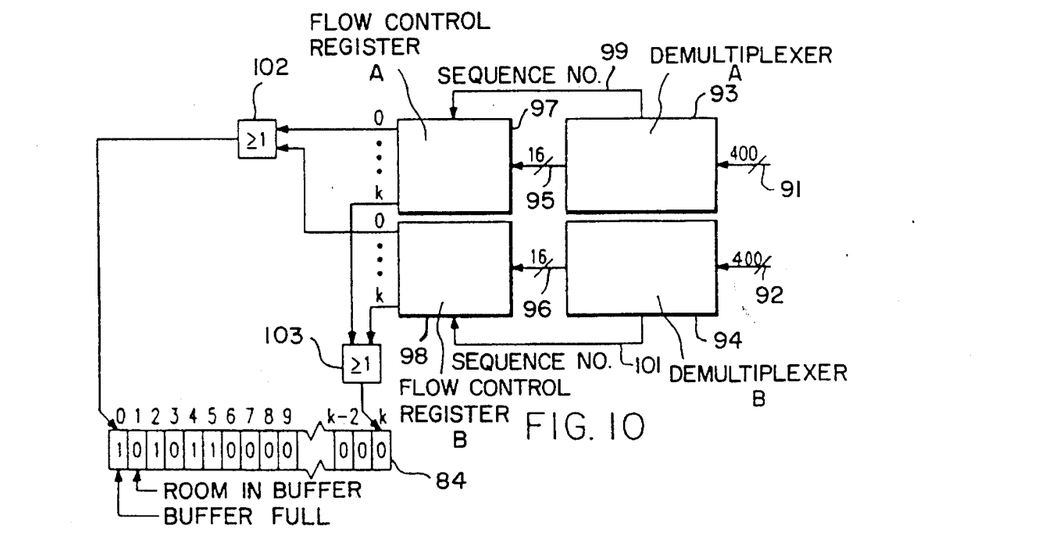
FIG. 10 is a schematic block diagram illustrating a circuit for the termination of redundant buffer fullness information constructed in accordance with the system of the present invention.

FIG. 10 is a schematic block diagram illustrating a circuit within which redundancy termination of flow control from the two planes of the switch core can be achieved. Entering the diagram at the upper right are two 400-bit length messages 91 and 92 from each switch core plane, of which, 16 bits comprise the output buffer status messages 95 and 96. The buffer information from plane A of the switch core is separated by a demultiplexer 93 while the buffer information from plane B is separated by a demultiplexer 94. Buffer status messages 95 and 96 are then fed into two flow-control registers 97 and 98, each of which comprises a plurality of K flip-flops. The number of flip-flops K is equal to the number of output buffers in the corresponding switch core plane, which may be, for example 24. Sequence numbers 99 and 101 are also sent from each demultiplexer 93 and 94 to its corresponding register 97 and 98 to ensure continuity of the data flow. Data from the two registers 97 and 98 are mixed in two OR-gates 102 and 103, and are placed in a composite data field 84 for use in controlling the flow of cells from the input buffer to the switch core.

In addition to the general function blocks illustrated in FIG. 10, the arrangement of the present invention includes a time-control unit which monitors the length of time over which an output buffer continues to signal that it is full. Since all transmissions of new data cells to a full output buffer cease, after a certain time period the buffer is again ready to receive data. The length of this time period depends on the length of time it takes for the constriction means to succeed in stopping all traffic to the output buffer, and the speed with which the output buffer empties. The length of time to stop all traffic is primarily a function of the number of incoming links in the switch. When the time monitor discovers that an output buffer has signalled that it is full for a period of time exceeding a predetermined time period, for example, 100 cell times, the time-control unit assumes that a fault has occurred in one of the switch planes. Since the traffic flow to that output buffer has been stopped, the buffer should have emptied 100 cells during that time period, and should be available. The time monitor then modifies the flow information and permits the flow restriction means again to transmit its data, so that a fault in one of the switch planes does not stop all traffic through the switch.

Figure 11:
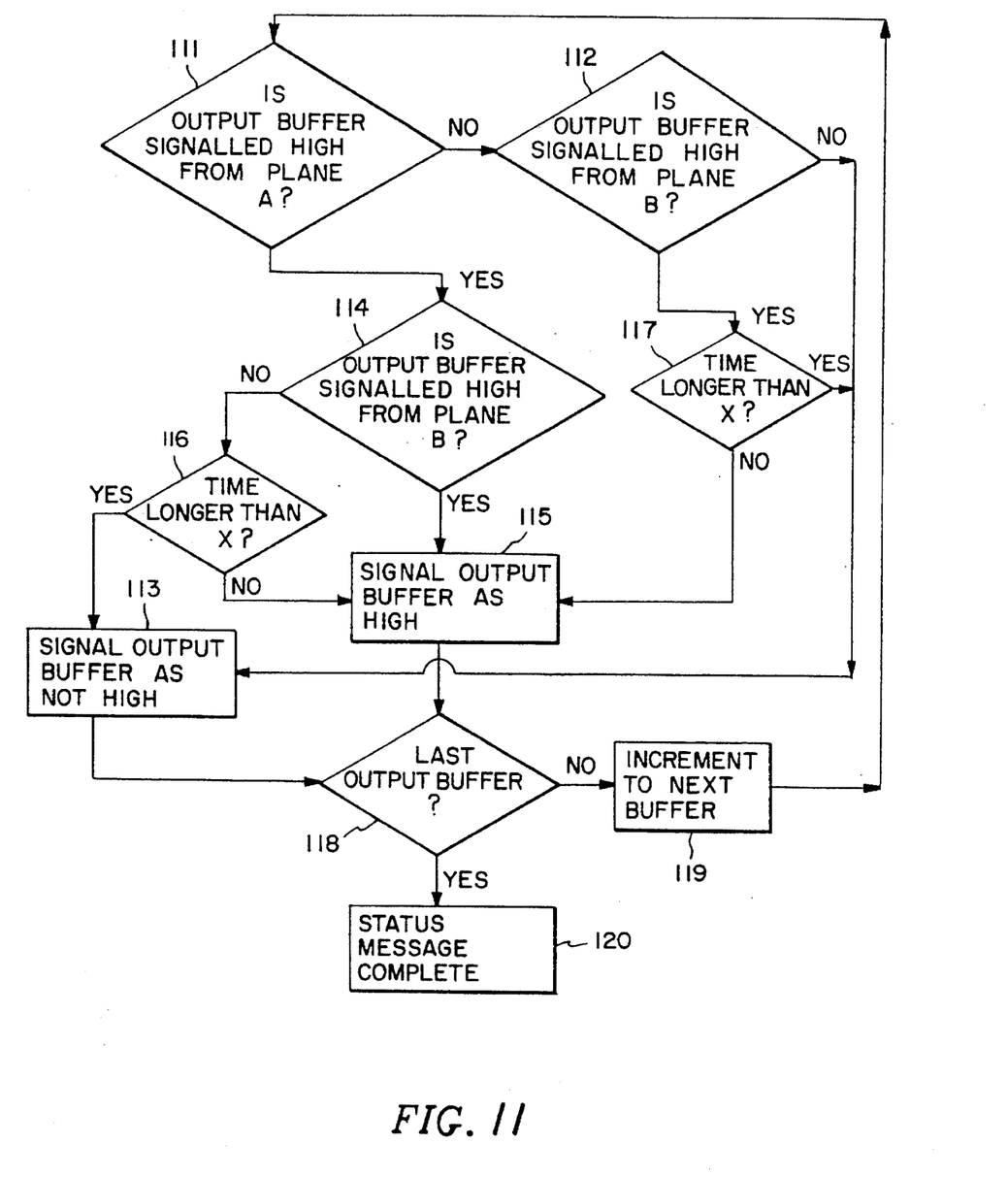
FIG. 11 is a flow chart of a software program which performs the redundancy termination function in a switch embodying the principles of the present invention.

FIG. 11 is a flow chart of a software program which performs the redundancy termination function in a switch embodying the principles of the present invention. The program is performed for each output buffer in order to compile a complete buffer status message 84. The program is entered at step 111 where it is determined whether or not the output buffer being reported was signalled as HIGH in the status message 95 from plane A of the switch core 67. If the buffer was not signalled as HIGH, the program moves to step 112 where it is determined if the buffer was signalled as HIGH in plane B. If not, the program moves to step 113 and signals the buffer as NOT HIGH in the composite status message 84. If, however, at step 111 the buffer was signalled as HIGH in plane A, the program moves to step 114 where it is determined whether the buffer was signalled as HIGH in plane B. If yes, the program moves to step 115 where the buffer is marked as high in the composite status message 84.

If, however, at step 114 the buffer was not signalled as HIGH in plane B, then the program moves to step 116 where it is determined whether or not the buffer has been signalled HIGH from plane A and NOT HIGH from plane B for a time longer than a predetermined time "X". If it has not, then the program moves to step 115 where the buffer is signalled as HIGH. If the buffer has been signalled HIGH from plane A and NOT HIGH from plane B longer than X, then the program moves to step 113 and signals the buffer as NOT HIGH in the composite status message 84.

If, at step 112, the buffer is signalled as HIGH from plane B, then the program moves to step 117 where it is determined whether or not the buffer has been signalled as HIGH from plane B and NOT HIGH from plane A for a period of time longer than X. If it has not, then the program moves to step 115 where the buffer is signalled as HIGH. If the buffer has been signalled HIGH from plane B and NOT HIGH from plane A longer than X, then the program moves to step 113 and signals the buffer as NOT HIGH in the composite status message 84.

After each buffer is signalled either HIGH or NOT HIGH, according to the preceding determinations, the program moves to step 118 where it is determined whether or not the buffer so signalled is the last output buffer in the switch core. If not, the buffer number is incremented to the next buffer at step 119, and the program returns to step 111 to perform the routine again. If, however, it is determined at step 118 that the buffer is the last buffer, then the program moves to step 120 where it is reported that the status message is complete.

In those embodiments in which the cell flow throttling means and the input buffers are placed in a single access device upstream of the switch port, the destinations of the cells are not known at that point. It is only known to which connection the cells belong. Such situations are dealt with by using a method in which each connection is allotted an entry code to the packet switch. This code, known as the Switch Access Code (SAC), is then used to ascertain whether or not the cell in this connection shall be stopped in the throttling constriction.

Figure 12:
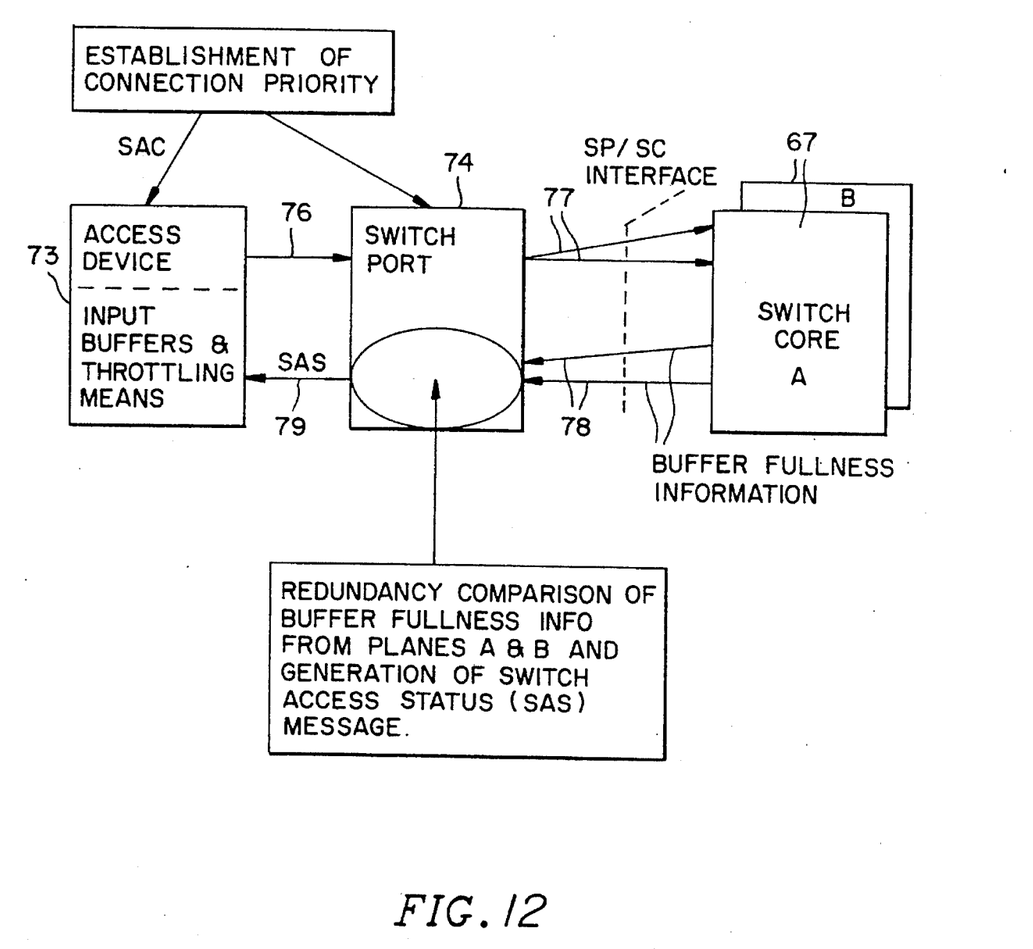
FIG. 12 is a block diagram of a flow controlled connection in an ATM switch employing a switch access code in accordance with the system of the present invention.

The flow control mechanism used in the present invention is illustrated in FIG. 12. In order to avoid transmitting a large number of data cells to an output buffer which is heavily loaded, it is essential that signals indicative of the extent of output buffer fullness be sent to applications with flow control in a simple fashion which thereby enables the decision to inhibit the traffic of cells to be made rapidly in the access devices or switch ports. This is suitably achieved through the use of a 24-bit signal field called the Switch Access Status (SAS) wherein each of the switch's 24 output buffers corresponds to a single data bit. If a data bit is set to "0", it means that the load, i.e., seizure on the corresponding output buffer is low, whereas, if the bit is set to "1", this means that the load, i.e., seizure on the output buffer is high. SAS is signalled over CBI, a serial interface format. A new SAS-value is signalled for each cell time.

Each flow-controlled connection is also allotted a 24-bit Switch Access Code (SAC) as part of establishing a standard connection. SAC contains information relating to the address contained within each data cell to be transmitted. SAC is constructed in a manner similar to SAS, wherein a "1" indicates that the cell is to be sent to a particular output, whereas a "0" indicates that the cell is not to be sent to the corresponding output.

Before a cell is sent over a flow-controlled connection, the cell addresses in the SAC are compared with the buffer status in the prevailing SAS. In this embodiment, a determination as to whether or not a particular cell is to be inhibited by the throttling means is effected by a simple comparison between the SAC and the SAS. The comparison is designed to be carried out quickly in a logic network. The two digital-coded parameters, SAC and SAS, are compared bit-wise, and if a particular bit is found in both parameters, then a hit has occurred. This means that cells may not be sent on that particular connection. The application then buffers the cells in the input buffer until SAS indicates that the addressed output buffer is available, and the comparison does not show a hit. If the comparison does not show a hit, cells may be sent in the usual manner.

Figure 13:
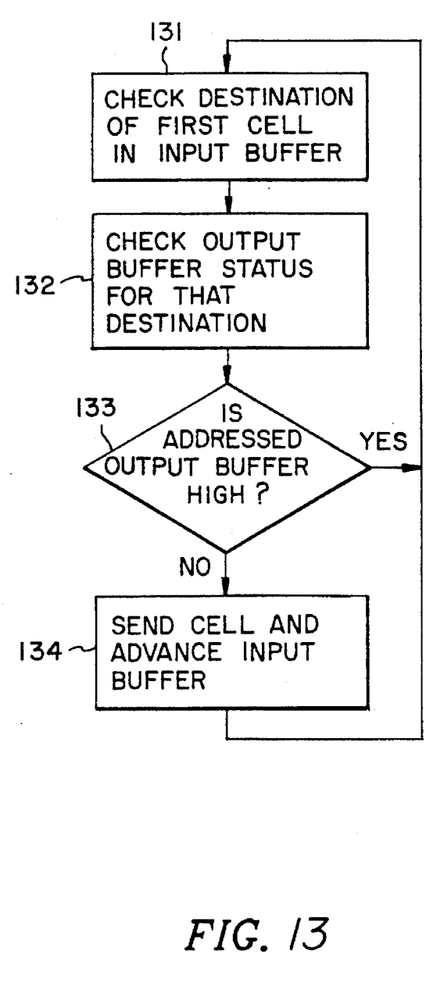
FIG. 13 is a flow chart for a software program which performs the throttling function at a single input buffer.

FIG. 13 is a flow chart for a software program which performs the throttling function at a single input buffer by comparing SAS with SAC. At step 131, the program checks the destination of the first information cell in line in a particular input buffer. At step 132, the program checks the status of the output buffer for that destination. At step 133, it is determined whether or not the addressed output buffer has been signalled as HIGH in the buffer status message 84. If the output buffer is HIGH, no cell is sent during that cell time, and the program returns to step 131. If the output buffer status is NOT HIGH, then the program moves to step 134 where the cell is sent and the next cell in the input buffer is advanced to the first position. The program then returns to step 131 and repeats the sequence during the next cell time.

Figure 13A:
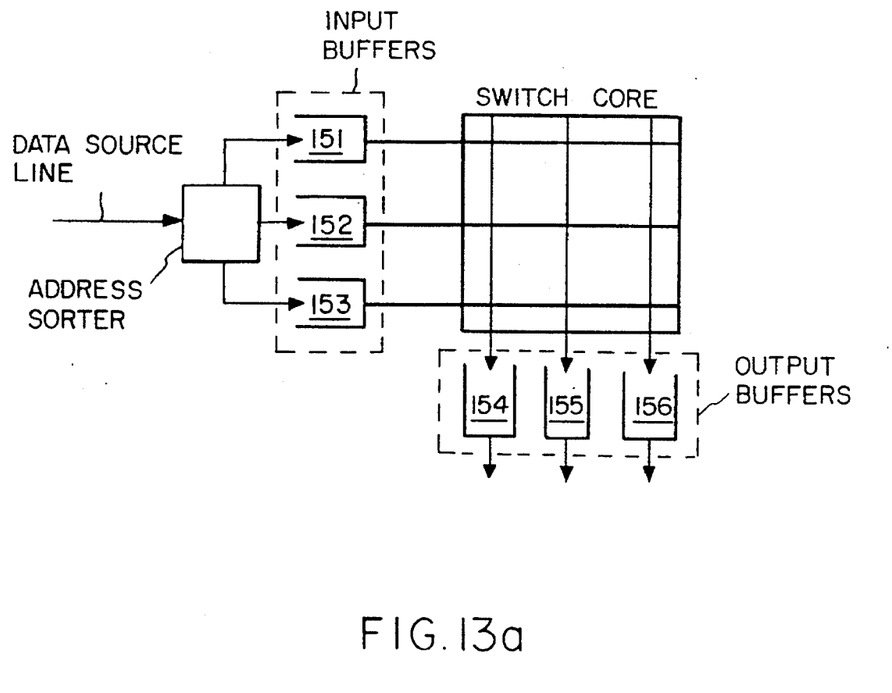
FIG. 13a is a block diagram illustrating an alternative embodiment of a packet switch which may be utilized to handle the head-of-line problem in input buffers when connected to a data source which sends most of its messages to three different addresses.

When the ATM switch is linked to data sources which, in most cases, send messages to the same output addresses, a different embodiment may be utilized to handle the HOL problem in the input buffers. FIG. 13a is a block diagram illustrating an alternative embodiment of a packet switch which may be utilized to handle the head-of-line (HOL) problem in input buffers when connected to a data source which sends most of its messages to three different addresses. If a source regularly sends messages to three different addresses, three input buffers may be connected in parallel to service that incoming link. The cells are sorted and placed in different input buffers 151–153, depending upon the destination of the cells. Cells to the output buffers 154–156 can then be plucked from the input buffer or input buffers which contain cells destined to an output buffer on which the seizure rate is low. In that way, if the output buffer addressed by the first cell on the link is full, it will not prevent the second or third cell on the link from being transmitted to one of the link's other commonly used addresses.

Figure 14:
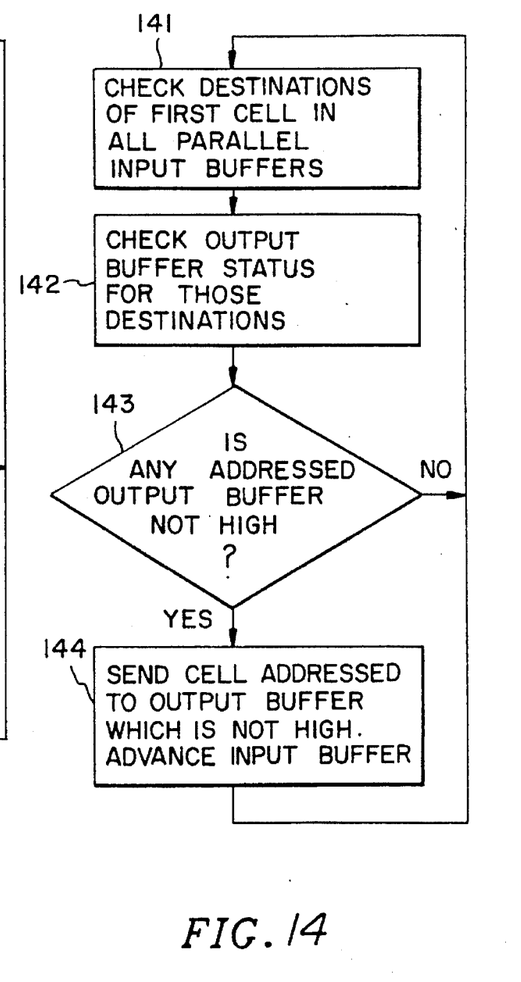
FIG. 14 is a flow chart for a software program which performs the throttling function at several input buffers connected in parallel.

FIG. 14 is a flow chart for a software program which performs the throttling function at several input buffers connected in parallel. At step 141, the program checks the destinations of the first cell in all of the parallel input buffers. At step 142, the program checks the status of the output buffers for those destinations. The program then moves to step 143 where it is determined whether or not any of the addressed output buffers are signalled as NOT HIGH. If not, no cells are sent during that cell time, and the program returns to step 141. If an addressed output buffer is signalled as NOT HIGH, then the program moves to step 144 where a cell addressed to the output buffer which is NOT HIGH is sent, and the cells in the corresponding input buffer are advanced so that the next cell in line is moved into the first position. The program then returns to step 141 and repeats the sequence during the next cell time.

There are three stages through which information cells pass when they are transmitted through an ATM switch: the switch core, switch port, and application. In all three stages, the information contained by SAS is processed so that the result will influence the next cell. The processing delay is therefore a maximum of one cell-time in each stage, or a total of three cell-times.

If 24 links transmit to an output buffer, there will be time for 72 cells (24×3) to enter the buffer during this three cell-time delay period, During this time, the buffer is emptied of three cells. The net addition is thus 69 cells. In order to ensure that no cells will be lost due to overfilling of the output buffers, the threshold is set to a value at which large buffer fullness will be signalled when less than 70 buffer places are found in the output buffer.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for controlling the flow of data cells from incoming communications links through a packet switch having an input side and an output side, said system comprising:

a plurality of output buffers connected in parallel to the output side of said packet switch;

means for monitoring the fullness level of each of said output buffers;

a plurality of access devices connected to the input side of said packet switch for controlling the flow of incoming data cells entering said switch, each of said access devices comprising;

a plurality of normally open input buffers connected in parallel and connected to said packet switch, for receiving data cells from said incoming communications links, each of said input buffers having sufficient capacity to hold a plurality of data cells wherein said input buffers further comprises means for sorting incoming data cells according to the output buffers to which said data cells are addressed: and means for placing said sorted data cells in different ones of said parallel access devices, each of said parallel input access devices storing data cells addressed to a different one of said output buffers; and selective stopping means connected to said input buffers for selectively stopping the flow of data cells leaving said input buffers, said means for selectively stopping the flow of data cells stopping only those data cells which are addressed to output buffers with fullness levels exceeding a predetermined level;

means for communicating the fullness level of each of said output buffers to said access devices, said access devices providing a signal to said selective stopping means for selectively stopping the flow of data cells leaving said input buffers in response to said communicating means.

2. The system of claim 1 wherein each of said incoming communications links is connected to a single one of said input buffers.

3. The system of claim 2 wherein said packet switch is an asynchronous transfer mode (ATM) switch.

4. The system of claim 3 wherein said ATM switch includes at least one switch port and at least one switch core.

5. The system of claim 4 wherein said output buffers are located in said switch core.

6. The system of claim 5 wherein said access devices are located in said switch port.

7. The system of claim 5 wherein said access devices are located in said data flow, upstream of said switch port.

8. A method of controlling the flow of data cells from incoming communications links through a packet switch having an input side and an output side, said method comprising the steps of:

connecting a plurality of output buffers in parallel to the output side of said packet switch;

monitoring the fullness level of each of said output buffers;

connecting a plurality of access devices to the input side of said packet switch for controlling the flow of incoming data cells entering said switch, said step of connecting access devices further comprising the step of:

sorting incoming data cells according to the output buffer to which said data cells are addressed;

placing said sorted data cells in different ones of said parallel input buffers; each of said parallel input buffers storing data cells addressed to a different one of said output buffers;

connecting a plurality of normally open input buffers in parallel to said incoming communications links for receiving data cells from said incoming communications links, each of said input buffers having sufficient capacity to hold a plurality of data cells;

communicating the fullness level of each of said output buffers to said access devices; and selectively stopping the flow of data cells leaving said input buffers by stopping only those data cells which are addressed to output buffers with fullness levels exceeding a predetermined level.

9. The method of claim 8 wherein the step of connecting said access device includes connecting each of said incoming communications links to a single one of said input buffers.

10. The method of claim 9 wherein the step of connecting at least one access device to the input side of said packet switch includes connecting at least one access device to an asynchronous transfer mode (ATM) switch.

11. The method of claim 10 wherein the step of connecting at least one access device to an ATM switch includes connecting at least one access device to an ATM switch having at least one switch port and at least one switch core.

12. The method of claim 11 wherein the step of connecting at least one output buffer to the output side of said ATM switch includes connecting at least one output buffer to said switch core of said ATM switch.

13. The method of claim 12 wherein the step of connecting at least one access device to said ATM switch includes placing said access device in said switch port of said ATM switch.

14. The method of claim 12 wherein the step of connecting at least one access device to said ATM switch includes placing said access device in said data flow, upstream of said switch port.

15. A method of controlling the flow of data cells through a packet switch, said method comprising the steps of:

providing said packet switch with a plurality of output buffers and an access device having a plurality of input buffers;

measuring the fullness level of each of said output buffers;

comparing the fullness level of each of said output buffers to a predetermined level;

constructing a status message of output buffer fullness levels wherein each data bit in said status message corresponds to a different one of said plurality of output buffers, said step of constructing a status message further comprising the steps of:

setting each of said data bits in said status message to a first value if the fullness level of said corresponding output buffer exceeds said predetermined level; and setting each of said data bits in said status message to a second value if the fullness level of said corresponding output buffer does not exceed said predetermined level;

sending said status message to said access device;

constructing an access message wherein each data bit in said access message corresponds to a different one of said plurality of output buffers, said step of constructing an access message further comprising the steps of:

setting each of said data bits in said access message to said first value if said corresponding output buffer is addressed by the first data cell in any of said input buffers; and setting each of said data bits in said access message to said second value if said corresponding output buffer is not addressed by the first data cell in any of said input buffers;

comparing said access message to said status message in a bit-wise comparison;

holding the first data cell in each of said input buffers in which said bit-wise comparison indicates that said first data cell is addressed to an output buffer with a fullness level exceeding said predetermined level; and sending the first data cell in each of said input buffers in which said bit-wise comparison indicates that said first data cell is addressed to an output buffer with a fullness level that does not exceed said predetermined level.

16. A method of controlling the flow of data cells through a packet switch, said method comprising the steps of:

providing said packet switch with a plurality of output buffers and an access device having a plurality of input buffers;

measuring the fullness level of each of said output buffers;

comparing the fullness level of each of said output buffers to a predetermined level;

constructing a status message of output buffer fullness levels wherein each data bit in said status message corresponds to a group of said output buffers, said step of constructing a status message further comprising the steps of:

setting each of said data bits in said status message to a first value if the fullness level of any output buffer in said corresponding group of output buffers exceeds said predetermined level; and setting each of said data bits in said status message to a second value if the fullness level of every output buffer in said corresponding group of output buffers does not exceed said predetermined level;

sending said status message to said access device;

constructing an access message wherein each data bit in said access message corresponds to a group of output buffers, said step of constructing an access message further comprising the steps of:

setting each of said data bits in said access message to said first value if any output buffer in said corresponding group of output buffers is addressed by the first data cell in any of said input buffers; and setting each of said data bits in said access message to said second value if none of said output buffers in said corresponding group of output buffers is addressed by the first data cell in any of said input buffers;

comparing said access message to said status message in a bit-wise comparison;

holding the first data cell in each of said input buffers in which said bit-wise comparison indicates that said first data cell is addressed to an output buffer in a group of output buffers having at least one output buffer with a fullness level exceeding said predetermined level; and sending the first data cell in each of said input buffers in which said bit-wise comparison indicates that said first data cell is addressed to an output buffer in a group of output buffers in which none of said group of output buffers has a fullness level that exceeds said predetermined level.

17. In an asynchronous transfer mode (ATM) switch having a plurality of output buffers connected to a pair of redundant switch core planes, a method of constructing a composite status message of the fullness levels of said output buffers, said method comprising the steps of:

measuring the fullness level of each of said output buffers in each switch core plane;

comparing the fullness level of each of said output buffers to a predetermined level;

constructing a status message, for each switch core plane, of output buffer fullness levels wherein each data bit in said status message corresponds to a different one of said plurality of output buffers, said step of constructing a status message further comprising the steps of:

setting each of said data bits in said status message to a first value if the fullness level of said corresponding output buffer exceeds said predetermined level; and setting each of said data bits in said status message to a second value if the fullness level of said corresponding output buffer does not exceed said predetermined level;

sending said status message from each of said switch core planes to a redundancy termination circuit in which a bit-wise comparison of said status messages is performed;

constructing a composite status message from said bit-wise comparison in which each data bit in said composite status message corresponds to a different one of said plurality of output buffers, said step of constructing a composite status message further comprising the steps of:

setting each of said data bits in said composite status message to said first value if the value of said data bit was said first value in the status message from either of said switch core planes; and setting each of said data bits in said composite status message to said second value if the value of said data bit was said second value in the status messages from both of said switch core planes.

18. A method of constructing a composite status message of the fullness levels of a plurality of output buffers in a pair of redundant switch core planes of an asynchronous transfer mode (ATM) switch, said method comprising the steps of:

measuring the fullness level of each of said output buffers in each of said switch core planes;

comparing the fullness level of each of said output buffers to a predetermined level;

constructing a status message, for each switch core plane, of output buffer fullness levels wherein each data bit in said status message corresponds to a different group of said output buffers, said step of constructing a status message further comprising the steps of:

setting each of said data bits in said status message to a first value if the fullness level of any output buffer in said corresponding group of output buffers exceeds said predetermined level; and setting each of said data bits in said status message to a second value if the fullness level of every output buffer in said corresponding group of output buffers does not exceed said predetermined level;

sending said status message from each of said switch core planes to a redundancy termination circuit in which a bit-wise comparison of said status messages is performed;

constructing a composite status message from said bit-wise comparison in which each data bit in said composite status message corresponds to a different group of said output buffers, said step of constructing a composite status message further comprising the steps of:

setting each of said data bits in said composite status message to said first value if the value of said data bit was said first value in the status message from either of said switch core planes; and setting each of said data bits in said composite status message to said second value if the value of said data bit was said second value in the status messages from both of said switch core planes.

19. A system for controlling the flow of data cells from incoming communications links through a packet switch having an input side and an output side, said system comprising:

means for connecting said packet switch to said incoming communications links;

means for storing said data cells on the input side of said packet switch, said input storing means including a plurality of input storing devices, each of which has sufficient capacity to store a plurality of data cells wherein said means for storing further comprises means for sorting incoming data cells according to the output storing device to which said data cells are addressed; and means for placing said sorted data cells in different ones of said parallel input storing devices, each of said parallel input storing devices storing data cells addressed to a different one of said output storing devices;

means for storing said data cells on the output side of said packet switch;

means for monitoring the fullness level of said output storing means;

means for communicating the fullness level of said output storing means to said input storing means; and means connected to said input storing means for stopping the flow of data cells through said input storing means in response to said communicating means.

20. The system of claim 19 wherein said means for storing data cells on the output side of said packet switch includes a plurality of output storing devices.

21. The system of claim 20 wherein said means for stopping the flow of data cells includes means for stopping only those data cells which are addressed to those output storing devices with fullness levels exceeding a predetermined level.

22. The system of claim 21 wherein said means for connecting said packet switch to said incoming communications links includes means for connecting each of said incoming communications links to a plurality of said input storing devices connected in parallel.

23. The system of claim 19 wherein said means for connecting said packet switch to said incoming communications links includes means for connecting each of said incoming communications links to a single one of said input storing devices.

* * * * *

UNITED STATES PATENT AND TRADEMARK OFFICE
CERTIFICATE OF CORRECTION

PATENT NO. : 5,493,566
DATED : February 20, 1996
INVENTOR(S) : Ljungberg, Martin P.A., et al.

It is certified that error appears in the above-indentified patent and that said Letters Patent is hereby corrected as shown below:

Column 11, line 39         Replace "addressed:"
                               With --addressed;--

Column 12, line 18         Replace "buffers;"
                               With --buffers,--

Signed and Sealed this

Twenty-eighth Day of May, 1996

Attest:

BRUCE LEHMAN

*Attesting Officer*          *Commissioner of Patents and Trademarks*